July 12, 1932.  L. G. SIMJIAN  1,866,581
SELF FOCUSING CAMERA
Filed June 16, 1931

INVENTOR
LUTHER G. SIMJIAN.
BY
Herbert H. Thompson
his ATTORNEY.

Patented July 12, 1932

1,866,581

UNITED STATES PATENT OFFICE

LUTHER G. SIMJIAN, OF NEW HAVEN, CONNECTICUT

SELF-FOCUSING CAMERA

Application filed June 16, 1931. Serial No. 544,782.

This invention relates to the art of photography and especially to a means for maintaining the correct focus adjustment in cameras regardless of the movement of the subject or camera. It is well known that so-called universal focus lenses are only adapted for very small cameras which give indifferent results and that for sizable portraits and pictures the relative position of the objective lens and plate or film must be adjusted to obtain definition in accordance with the distance of the subject from the camera. By my invention I propose to provide an automatic means to maintain the proper focus controlled preferably by radiant energy emitted from or interrupted by the subject as by reflection, which varies as a function of distance between the subject and camera. For this purpose I employ a cell sensitive to radiant rays, such as a photo-electric cell which is not only sensitive to light rays of the visible spectrum but also to infra red and ultra violet rays. By employing only infra red rays, for instance, the rays used to actuate the cell need not be recorded on the photographic plate.

Other objects of the invention will be apparent as the description proceeds.

Referring to the drawing showing several forms the invention may assume,

Figure 1:
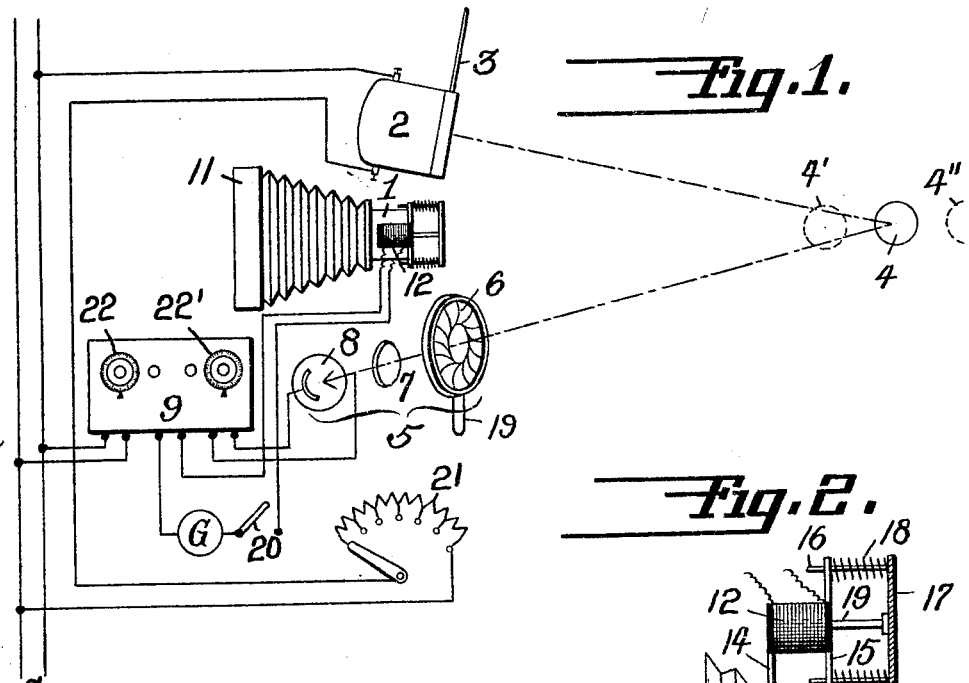
Fig. 1 is a diagram showing one form of my invention utilizing the light reflected from the subject as a measure of its distance.

In Fig. 1 a camera of adjustable focus is shown generally at 1, and a source of light at 2. Said source may emit ordinary light or a screen 3 may be provided to cut out all or most of the visible spectrum, leaving only the infra red rays (for instance). Both the light and camera are shown trained on the subject 4.

At 5 is shown generally a light sensitive optical system comprising an adjustable shutter, such as an iris shutter 6, concentrating lens 7 and photo-electric cell 8. As shown in Fig. 1, this system receives rays reflected from the subject, the intensity of which varies inversely as about the fourth power of the distance of the subject from the light source and cell. The output of the cell 8 is led first through a suitable amplifying relay which may comprise a system of thermionic tubes represented as enclosed within the box 9, the tubes being powered from the supply line S. The output of the thermionic relay is led to an electro-magnetic means on the camera which automatically controls the focus thereof by adjusting the relative distance between the objective lens 10 and the plate or film holder 11. Such means is shown as comprising a solenoid 12 secured to the sleeve 13 supporting the lens 10 by means of brackets 14—15. The latter is shown as slidably supported on a plurality of guide rods 16 extending from a fixed support 17. Normally the plates 14 and 15 are pushed to the left by compression springs 18 around said guide rods. When the solenoid is excited, however, the core 19 fixed to the plate 17 is attracted by the solenoid, thus pulling the solenoid 12 to the right against the springs 18 a distance proportional to a function of the strength of the current flowing through the solenoid. The stronger the current the farther the lens is moved from the plate, therefore, the greater the distance between the objective lens and the plate. Since the light reflected by the subject 4 increases rapidly with the movement of the object toward the camera, it will readily be seen that the strength of the solenoid will be rapidly increased and, therefore, the focal length increased.

It is, of course, necessary that the camera be originally properly focused on the object, or in other words, the apparatus synchronized with the position of the subject at the beginning of the photographic operation. This may be accomplished in several different ways used alternatively or jointly. Thus the focus of the camera may be initially set to the proper distance by adjusting the iris shutter 6 as by means of the handle 19. This varies the amount of light falling on the cell 8, and by this means the camera can be adjusted to the proper focus. After so adjusting, the camera will be automatically focused regardless of the movements of the object toward or away from the camera represented by positions 4' and 4", since such movements will cause variable excitation of the solenoid 12 as explained. Having obtained the proper focus, the galvanometer G may be observed and used as the initial setting means for subsequent operations. In other words, in beginning a new set of pictures with the same subject, the shutter 6 may be adjusted until the galvanometer G shows a predetermined reading when the switch 20 is closed and the automatic focusing mechanism brought into operation. Another method of effecting initial adjustment is by adjusting the intensity of the light source as by means of the rheostat 21. Still another means is by adjusting the amplification of the thermionic relay as by means of varying the tuning through the knobs 22—22'.

Figure 2:
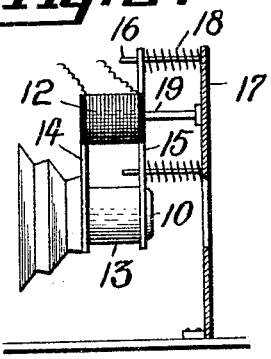
Fig. 2 is a detail, partially in section, of the adjustable lens of the camera.
Figure 3:
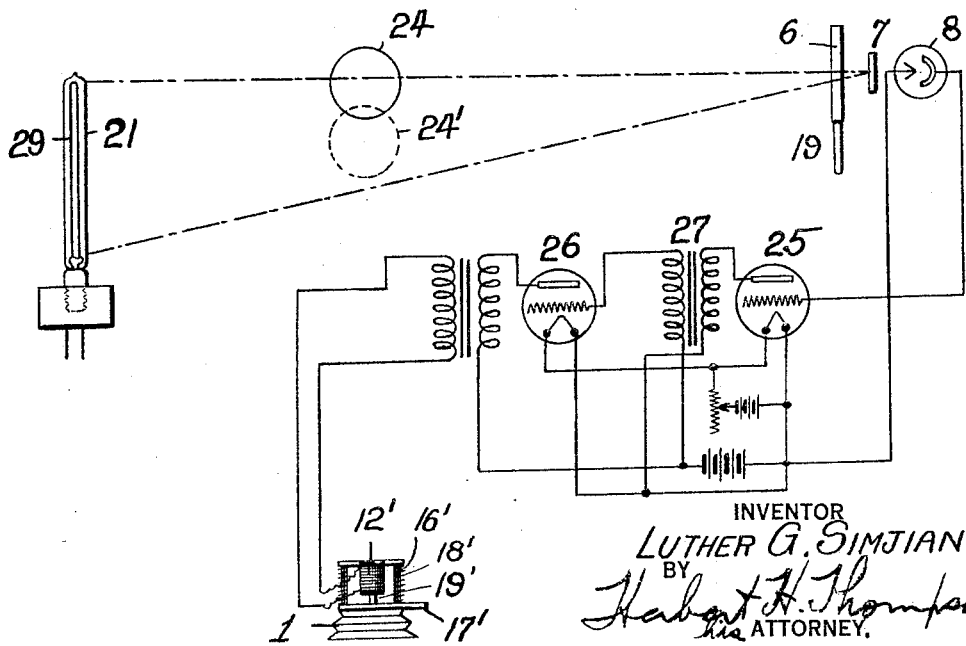
Fig. 3 is a diagram of a modification utilizing the shadow or light absorbing principle as a measure of distance.

It is, of course, obvious that other light effects may be utilized to accomplish my invention. For instance, in Fig. 3 I have shown a subject 24 as positioned between the light source 2 and the light sensitive cell 8 so that the subject serves to cut off or screen a portion of the light from this source, which varies with the movements of the subject at an angle to the line connecting the light source and the cell. In this instance I prefer to place the camera 1 at right angles to said line so that movement of the subject from 24 to 24' quickly varies the amount of light intercepted between the light source and the cell and thereby varies the focus of the camera as before explained. The light source is shown as in the form of an elongated tube having a long filament 29 which is preferably illuminated to dull red heat. In Fig. 3 I have also shown diagrammatically a simple thermionic relay of two tubes 25 and 26, the output of the cell 8 being led to the grid of tube 25, the plate of which is connected to the inter-stage transformer 27 and thence to the grid of the second tube 26, the output thereof being carried directly or indirectly to the solenoid 12' on the camera. In this instance, however, the action of the solenoid is the reverse of that in Fig. 2, since the nearer the subject approaches the camera the less light is received by the cell 8. The fixed plate 17' in this instance is mounted above the bellows portion of the camera, while the plate 16' is secured to the lens holder, the solenoid being mounted on plate 16' and the core on the plate 17'. The stronger the excitation of the solenoid, therefore, the shorter will be the focal length of the camera.

From the foregoing, the operation of my invention should be readily apparent. My invention has a special adaptation to the taking of close-up motion pictures in that it permits accurate focusing to be maintained while the subject moves around. Supposing, for instance, it is desired to take motion pictures of the subject 4 in Fig. 1. The correct focusing is first obtained by any one of the methods outlined above. This may be done by starting with the subject in a predetermined position and adjusting the iris shutter 6, rheostat 21 or knobs 22, 22' until the galvanometer G reads a known value, or the same adjustments may be effected until the operator sees the subject is correctly focused on the ground glass finder of the camera. The pictures are then ready to start and switch 20 is closed, whereupon the correct focus will be maintained for a series of motion pictures regardless of the movements of the subject.

It should be understood that my invention is equally adaptable for different focal length lenses. Thus, if the lens 1 is replaced by a lens of greater or less focus, the actual amount that the lens must be moved for a given change of position of the subject would be varied. In order to take care of this, the operator may adjust the ratio of amplification in the amplifier 9 by means of the knobs 22—22', or if desired a variable resistance could be inserted in circuit with the solenoid 12 having a slider movable with the lens to change the rate of change of the strength of the solenoid with the movements of the subject.

It is also obvious that if desired a counterweight could be used as a yielding means to oppose the solenoid 12 instead of the springs 18.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An automatic focusing means for cameras including a light sensitive cell, a camera having an adjustable focus, and means governed by said cell for automatically adjusting said focus.

2. An automatic focusing means for cameras including a light sensitive cell, a collective lens for directing rays from the vicinity of the subject on said cell, a camera having an adjustable focus, and amplifying means governed by said cell for automatically adjusting said focus.

3. An automatic focusing means for cameras including a light sensitive cell, a collective lens for directing rays from the vicinity of the subject on said cell, adjustable means for varying the amount of light passing through said lens, a camera having an adjustable focus, and amplifying means governed by said cell for automatically adjusting said focus.

4. An automatic focusing means for cameras including a light sensitive cell, a collective lens for directing rays from the vicinity of the subject on said cell, a camera having an adjustable focus, amplifying means governed by said cell for automatically adjusting said focus, and adjustable means for varying the output of said amplifier for initial synchronization.

5. An automatic focusing means for photographic work including a source of radiant energy directed toward the subject, a ray sensitive cell sensitive to such rays for receiving reflected rays from the subject, a camera, and electro-magnetic means thereon for adjusting the focus controlled by the output of said cell.

6. An automatic focusing means for photographic work including a source of radiant energy directed toward the subject, a ray sensitive cell sensitive to such rays for receiving reflected rays from the subject, a camera, electro-magnetic means thereon for adjusting the focus controlled by the output of said cell, and means for initially synchronizing the camera and cell output to obtain the proper focus.

7. An automatic focusing means for cameras including a light sensitive cell, a camera having an adjustable focus, means governed by said cell for automatically adjusting said focus, and means for initially obtaining the proper focus through said first-named means.

8. An automatic focusing means for cameras including a light sensitive cell, a camera having an adjustable focus, means governed by said cell for automatically adjusting said focus, and means for varying the amount of light falling on said cell for the purpose specified.

9. An automatic focusing means for cameras including a light sensitive cell, a camera having an adjustable focus, means governed by said cell for automatically adjusting said focus, and means for varying the intensity of the light source for initial focusing.

10. An automatic focusing means for cameras including a light sensitive cell, a collective lens for directing rays from the vicinity of the subject on said cell, a shutter for varying the amount of light passing through said lens, a camera having an adjustable focus, and amplifying means governed by said cell for automatically adjusting said focus.

In testimony whereof I have affixed my signature.

LUTHER G. SIMJIAN.